J. T. LAGERGREN.
SHAFT BEARING.
APPLICATION FILED NOV. 16, 1907.
903,872.
Patented Nov. 17, 1908.
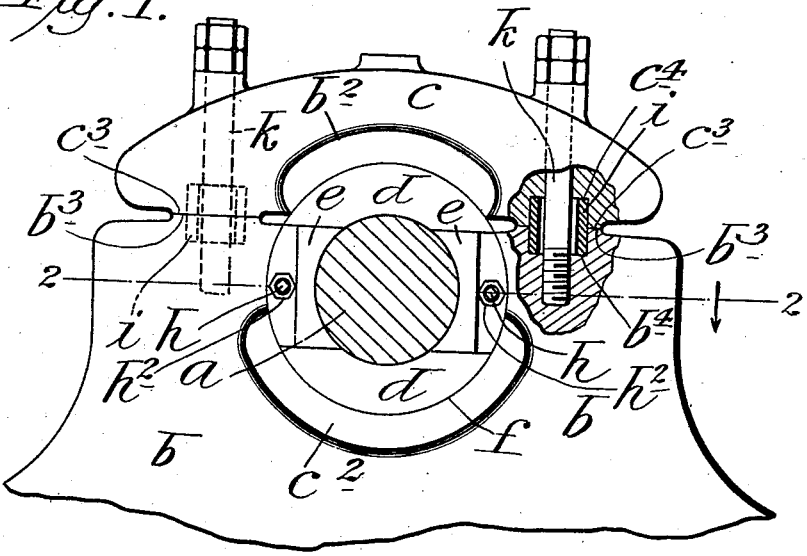
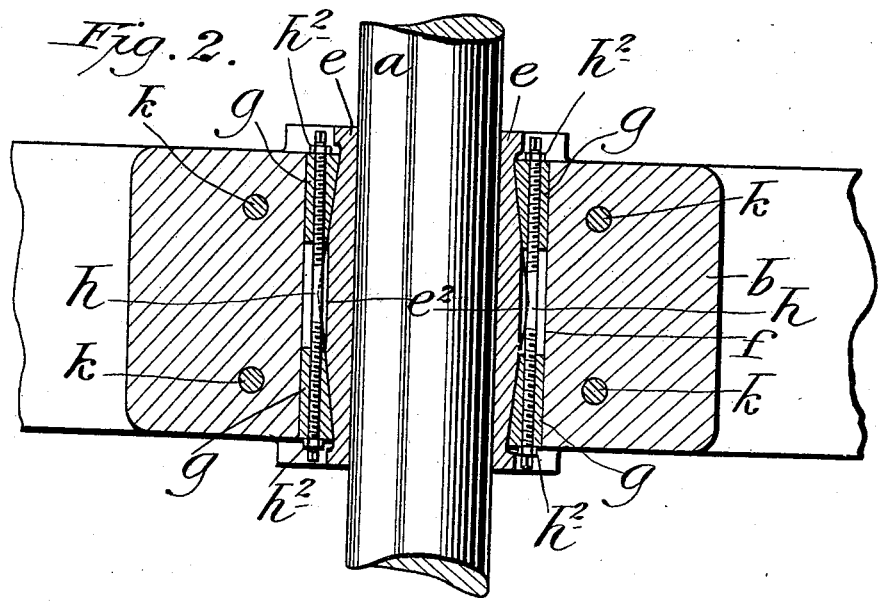
WITNESSES
M. E. Doody
C. E. Mulreany
INVENTOR,
Jonas T. Lagergren,
BY Edgar Tate & Co.
ATTORNEYS Be it known that I, Jonas T. Lagergren, a subject of the King of Sweden, and residing at New York, in the county of New York and State of New York, have invented certain new and useful Improvements in Shaft-Bearings, of which the following is a specification, such as will enable those skilled in the art to which it appertains to make and use the same.
UNITED STATES PATENT OFFICE.

JONAS T. LAGERGREN, OF NEW YORK, N. Y.

SHAFT-BEARING.

No 903,872.     Specification of Letters Patent.     Patented Nov. 17, 1908.

Application filed November 16, 1907. Serial No. 402,419.

To all whom it may concern:

This invention relates to bearings for power shafts and similar shafts, and particularly for reciprocating engine shafts; and the object thereof is to provide an improved bearing for shafts of this class which is simple in construction, and which may be easily, cheaply and conveniently fitted and applied; a further object being to provide a bearing for shafts of the class specified which employ horizontally movable wedge members to set up the separate parts of the bearing instead of vertically movable wedge members, and by means of which the planing or fitting necessary when vertically movable wedge members are employed will be avoided; a further object being to provide a bearing for shafts of the class specified which will be much stronger, and much more durable than shaft bearings of this class as usually constructed.

The invention is fully disclosed in the following specification, of which the accompanying drawing forms a part, in which the separate parts of my improvement are designated by suitable reference characters in each of the views, and in which:—

Figure 1 is a side view of a shaft bearing made according to my invention and showing the shaft in cross section, part of the construction of the bearing being broken away, and Fig. 2 a horizontal section on the line 2, 2 of Fig. 1.

In the drawing forming part of this specification I have shown at $a$ a power shaft of the type herein specified, and in the practice of my invention I provide a bearing comprising an outer main base member or support $b$, and a top member $c$ within which are placed, in horizontal position, the bearing proper consisting of similar top and bottom members $d$ and similar side members $e$.

The top and bottom members $b$ and $c$ are provided in their adjacent faces with transverse recesses which are semicircular in cross section which form a central circular aperture $f$, in which the bearing members $d$ and $e$ are placed, and said top and bottom members are provided on their opposite sides with projecting segmental beads $b^2$ and $c^2$, in the form of construction shown. The top and bottom members $d$ of the bearing proper are provided with parallel faces, between which the side members $e$ of the bearing are placed, and the side members $e$ of the bearing are beveled on their outer sides from both ends toward the center and are thickest at the center, and this forms corresponding spaces in which are placed wedge blocks $g$, the inner sides of which are tapered to correspond with the taper at the opposite ends of the parts $e$, the outer surfaces of the wedge blocks $g$ being cylindrical, as clearly shown in Fig. 2, and passed horizontally and longitudinally through the wedge blocks $g$ are bolts $h$, the opposite end portions of which are provided with reverse threads and with jam nuts $h^2$, the extreme end portions of said bolts being angular in form in cross section in order that a wrench or spanner may be applied thereto, and by turning said bolts in one direction the wedge blocks may be forced inwardly and the side members $e$ of the bearing pressed against the shaft $a$, and by turning said bolts in the opposite directions the blocks $g$ may be forced inwardly and the pressure on the side members $e$ of the bolt released, and the nuts $h^2$ may be manipulated to hold the blocks $g$ in operative position.

The base member or support $b$ of the bearing is provided on the opposite sides of the aperture $f$ and of the bearing proper with raised surfaces $b^3$, and the top part $c$ is provided with corresponding raised surfaces $c^3$ in which are formed, respectively recesses $b^4$ and $c^4$, in which are placed sleeves $i$ which tightly fit said recesses, and the parts $b$ and $c$ are connected by bolts $k$ which are passed downwardly through the part $c$ and into the part $b$ and through the sleeves $c^4$. The screws $h$ are of less diameter than the inner diameter of the sleeves $i$, and said sleeves serve to hold the parts $b$ and $c$ against lateral movement, while the bolts $k$ serve to bind said parts together.

The parts $d$ and $e$ of the bearing proper are made of brass or any other suitable material, and said parts $e$ in the form of construction shown are provided at the middle of their outer surfaces and at their thickest points with longitudinal recesses $e^2$ through which the bolts $k$ pass.

By arranging the bearing members $d$ and $e$ horizontally and providing two clamp blocks for each of said parts, said clamp blocks being also arranged horizontally and by passing the screws $h$ horizontally through said blocks, in the manner shown and described, I provide a greater bearing surface for the shaft $a$ and more effective means for forcing the parts $e$ inwardly, and also avoid the necessity of planing or otherwise exactly finishing the spaces in which the parts $e$ and wedge members are placed.

It is necessary, in practice, to mill or plane the surfaces between the top and bottom casing members $b$ and $c$ so as to provide a tight fit, and by forming the raised surfaces $b^3$ and $c^3$ on these members, the surfaces to be milled or planed are reduced in dimensions, and by inserting the sleeves $i$ in the recesses $b^4$ and $c^4$ the strain on the bolts $h$ is, in a measure removed, and the danger of breaking said bolts obviated.

By forming a transverse circular aperture $f$ in the top and bottom members $b$ and $c$ and placing the bearings $d$ and $e$ and the wedge members $g$ in this aperture as shown and described, I provide means whereby by simply manipulating the bolts or screws $h$ and causing the wedge members $g$ to move outwardly the entire bearing or the parts $d$ and $e$ may be rotated in the circular aperture $f$ and said parts easily removed whenever desired for repairing or other purposes, and as easily replaced in position when necessary.

Having fully described my invention, what I claim as new and desire to secure by Letters Patent, is:—

1. A shaft bearing composed of a casing consisting of top and bottom parts, said parts being provided in their adjacent faces with transverse recesses which are semi-circular in cross section and forming when said parts are secured together a transverse aperture which is circular in form in cross section, horizontal top and bottom bearing members and horizontal side bearing members, said side bearing members being beveled or inclined on their outer sides from the middle thereof toward both ends, wedge blocks placed at the opposite ends of the side bearing members, and bolts passed through said wedge blocks and by means of which said blocks may be drawn together, and said side bearing members forced inwardly, all of said bearing members and said wedge blocks being adapted to be rotated in said aperture when the wedge blocks are loosened.

2. A shaft bearing composed of a casing consisting of top and bottom parts, said parts being provided in their adjacent faces with transverse recesses which are semi-circular in cross section and forming when said parts are secured together a transverse aperture which is circular in form in cross section, horizontal top and bottom bearing members, and horizontal side bearing members, said side bearing members being beveled or inclined on their outer sides from the middle thereof toward both ends, wedge blocks placed at the opposite ends of the side bearing members, and bolts passed longitudinally and horizontally through said wedge blocks, the opposite end portions of said bolts being provided with reverse threads, whereby by turning said bolts in one direction the wedge blocks will be forced inwardly, and by turning said bolts in the opposite direction the wedge blocks will be drawn outwardly, all of said bearing members and said wedge blocks being adapted to be rotated in said aperture when the wedge blocks are loosened or moved outwardly.

In testimony that I claim the forgoing as my invention I have signed my name in presence of the subscribing witnesses this 15th day of November 1907.

JONAS T. LAGERGREN.

Witnesses:
M. E. Doody,
C. E. Mulreany.